United States Patent
Tanoue et al.

(10) Patent No.: US 11,458,947 B2
(45) Date of Patent: Oct. 4, 2022

(54) VEHICLE AND CONTROL METHOD

(71) Applicant: TOYOTA JIDOSHA KABUSHIKI KAISHA, Toyota (JP)

(72) Inventors: Hidetaka Tanoue, Miyoshi (JP); Masato Nonaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 559 days.

(21) Appl. No.: 16/676,924

(22) Filed: Nov. 7, 2019

(65) Prior Publication Data

US 2020/0180592 A1   Jun. 11, 2020

(30) Foreign Application Priority Data

Dec. 7, 2018   (JP) .............................. JP2018-229686

(51) Int. Cl.
| | |
|---|---|
| B60W 10/30 | (2006.01) |
| B60R 25/01 | (2013.01) |
| B60L 50/70 | (2019.01) |
| E05B 49/00 | (2006.01) |
| H04B 15/02 | (2006.01) |
| B60H 1/00 | (2006.01) |
| E05B 47/00 | (2006.01) |

(52) U.S. Cl.
CPC ......... *B60W 10/30* (2013.01); *B60H 1/00278* (2013.01); *B60L 50/70* (2019.02); *B60R 25/01* (2013.01); *E05B 49/00* (2013.01); *H04B 15/02* (2013.01); *E05B 2047/0095* (2013.01)

(58) Field of Classification Search
CPC .... B60W 10/30; B60L 50/70; B60H 1/00278; B60R 25/01; E05B 49/00; E05B 2047/0095; H04B 15/02
See application file for complete search history.

(56) References Cited

U.S. PATENT DOCUMENTS

| | | | | |
|---|---|---|---|---|
| 2009/0169937 | A1* | 7/2009 | Umayahara | H01M 8/04955 |
| | | | | 429/532 |
| 2011/0013364 | A1* | 1/2011 | Howes | H05K 7/20936 |
| | | | | 361/699 |
| 2013/0306387 | A1* | 11/2013 | Katano | B60L 50/71 |
| | | | | 180/65.31 |
| 2015/0273976 | A1* | 10/2015 | Enomoto | B60L 3/0046 |
| | | | | 62/243 |
| 2016/0121735 | A1* | 5/2016 | Sugano | H02J 7/342 |
| | | | | 320/109 |
| 2017/0331130 | A1* | 11/2017 | Kawase | H01M 8/04671 |
| 2019/0061685 | A1* | 2/2019 | Lee | B60R 25/209 |
| 2019/0198900 | A1* | 6/2019 | Ohashi | H01M 8/0435 |

FOREIGN PATENT DOCUMENTS

| | | |
|---|---|---|
| JP | 2010-133181 A | 6/2010 |
| JP | 2018-041688 A | 3/2018 |

* cited by examiner

*Primary Examiner* — Thomas D Alunkal
(74) *Attorney, Agent, or Firm* — Sughrue Mion, PLLC (57) ABSTRACT

A vehicle includes a control device. The control device stops an operation of a flow path switching valve simultaneously with limiting output of a fuel cell when an authentication of a mobile device is performed.

10 Claims, 5 Drawing Sheets

VEHICLE AND CONTROL METHOD

INCORPORATION BY REFERENCE

The disclosure of Japanese Patent Application No. 2018-229686 filed on Dec. 7, 2018 including the specification, drawings and abstract is incorporated herein by reference in its entirety.

BACKGROUND

1. Technical Field

The present disclosure relates to a vehicle provided with a fuel cell, a cooling device, a smart key system, and a control device and a control method.

2. Description of Related Art

As a vehicle of the above type, a vehicle provided with a keyless entry system that authenticates a mobile device via communication and unlocks the locked state of an opening and closing body (a door) of the vehicle has been proposed (for example, see Japanese Unexamined Patent Application Publication No. 2010-133181). In this vehicle, when an opening operation of the opening and closing body (a back door) is detected from the outside of the vehicle and a working of a motor mounted on a body of the vehicle (a blower motor of an air conditioner, a fan motor of a radiator, or a wiper motor) is detected, after the operation of the motor is inhibited, authentication (checking ID information) is performed. As such, it is possible to curb the occurrence of noise, generated from the motor, which interferes with communication with the mobile device, and perform the opening and closing operation of the opening and closing body.

SUMMARY

There exists a fuel cell vehicle on which a fuel cell, which supplies electric power to a traveling motor, is mounted as one form of a vehicle. Generally, the fuel cell vehicle is provided with a cooling device that cools the fuel cell by exchanging heat with a coolant to maintain the fuel cell at an appropriate operating temperature. The cooling device may be provided with a circulation flow path that connects the fuel cell and a radiator, a pump that circulates the coolant in the circulation flow path, a bypass flow path that connects the upstream side and the downstream side of the radiator in the circulation flow path, a flow path switching valve that switches the destination of the coolant that passes through the fuel cell to circulate to the radiator side and the bypass flow path side, and a valve driving motor that drives the flow path switching valve. In the fuel cell vehicle, when the keyless entry system described above is provided, it can be considered that the operation of the valve driving motor is suppress at the time of authentication to prevent interference by noise generated by the operation of the valve driving motor during communication with a mobile device. However, depending on the valve position of the flow path switching valve at that time, the fuel cell may not be sufficiently cooled.

The present disclosure provides a vehicle and a control method that can curb the generation of noise, which occurs with an operation of a flow path switching valve and interferes with authentication of a mobile device, and sufficiently cool a fuel cell.

A vehicle according to a first aspect of the present disclosure includes a fuel cell, a cooling device configured to cool the fuel cell by exchanging heat with a coolant, a smart key system configured to communicate with a mobile device and perform authentication of the mobile device, and a control device configured to control the fuel cell and the cooling device. The cooling device includes a circulation flow path configured to connect the fuel cell and a radiator, a pump configured to circulate the coolant in the circulation flow path, a bypass flow path configured to connect the upstream side and the downstream side of the radiator in the circulation flow path, a flow path switching valve configured to switch the destination of the coolant that passes through the fuel cell to circulate to the radiator side and the bypass flow path side, and a motor configured to drive the flow path switching valve. When the smart key system performs the authentication of the mobile device, the control device is configured to stop an operation of the flow path switching valve simultaneously with limiting output of the fuel cell.

According to the above first aspect, when the authentication of the mobile device is completed or when a predetermined time elapses after the operation of the flow path switching valve is stopped, the control device may release the stopped state of the operation of the flow path switching valve simultaneously with canceling the limit of the output of the fuel cell.

When the smart key system performs the authentication of the mobile device by, the control device stops the operation of the flow path switching valve and limits the output of the fuel cell. When the authentication of the mobile device is completed or when the predetermined time elapses, the control device releases the stopped state of the operation of the flow path switching valve simultaneously with canceling the limit of the output of the fuel cell. As such, it is possible to curb the occurrence of noise, from the motor, which may interfere with communication with the mobile device, simultaneously with curbing overheating of the fuel cell even though the valve position of the flow path switching valve is fixed near the position where it is fully open to the bypass flow path side. Here, "motor" includes a stepping motor.

According to the above first aspect, the flow path switching valve may adjust a distribution ratio of a flow rate of the coolant flowing on the radiator to a flow rate of the coolant flowing on the bypass flow path. The control device may stop, when the smart key system performs the authentication, the operation of the flow path switching valve, and set the maximum output of the fuel cell based on the position at which the flow path switching valve is stopped, and control the fuel cell such that the output of the fuel cell does not exceed the maximum output.

According to the above first aspect, the control device may set the maximum output such that a larger output from the fuel cell is allowed when the position at which the flow path switching valve is stopped is on the radiator side than when the position at which the flow path switching valve is stopped is on the bypass flow path side.

As such, since the output of the fuel cell is not excessively limited, an adverse effect caused by limiting the output of the fuel cell can be minimized.

According to the above first aspect, the motor may be a stepping motor. When the smart key system performs the authentication, the control device may fix the valve position of the flow path switching valve by maintaining electrical excitation to a coil of the motor.

As such, it is possible to more accurately determine the valve position of the flow path switching valve, simultaneously with appropriately fixing the position of the valve when the authentication is performed.

According to the above first aspect, the flow path switching valve may adjust the distribution ratio of the flow rate of the coolant flowing on the radiator to the flow rate of the coolant flowing on the bypass flow path. The control device may set a maximum output of the fuel cell based on the distribution ratio, and when the smart key system performs the authentication, control the fuel cell such that the output of the fuel cell does not exceed the maximum output.

According to the above first aspect, the control device may set the maximum output such that the larger the flow rate of the coolant flowing on the radiator is in the distribution ratio, the larger the maximum output becomes.

A control method according to a second aspect of the present disclosure controls a cooling device of a fuel cell mounted on a vehicle. The control method includes a step of stopping an operation of a flow path switching valve and limiting output of the fuel cell when a smart key system mounted on the vehicle performs authentication of a mobile device. The fuel cell is connected to a radiator via a circulation flow path in which a coolant circulates. The upstream side and the downstream side of the radiator in the circulation flow path are connected to each other via a bypass flow path. The flow path switching valve switches the destination of the coolant that passes through the fuel cell to circulate to the radiator side and the bypass flow path side.

According to the above second aspect, the control method may further include a step of canceling the limit of the output of the fuel cell by resuming the operation of the flow path switching valve when the authentication of the mobile device is completed or when a predetermined time elapses after the operation of the flow path switching valve is stopped.

According to the above second aspect, the control method may further include a step of setting a maximum output of the fuel cell based on the distribution ratio of the flow rate of the coolant flowing on the radiator to the flow rate of the coolant flowing on the bypass flow path, and a step of controlling the fuel cell such that the output of the fuel cell does not exceed the maximum output when the authentication is performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, an embodiment of the present disclosure will be described with reference to the drawings.

Figure 1:
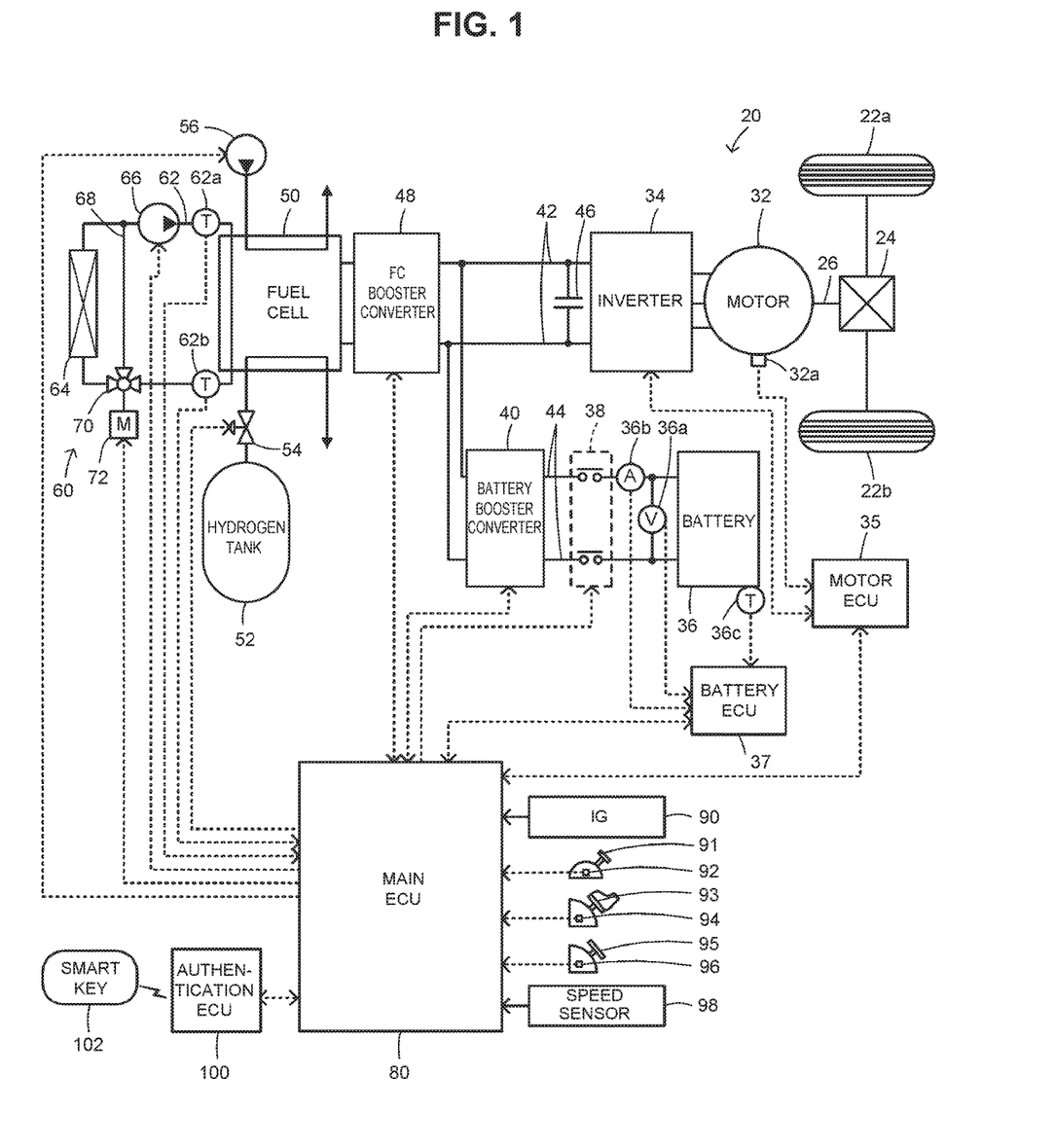
FIG. 1 is a diagram schematically illustrating a configuration of a vehicle according to one embodiment of the present disclosure.
Figure 2:
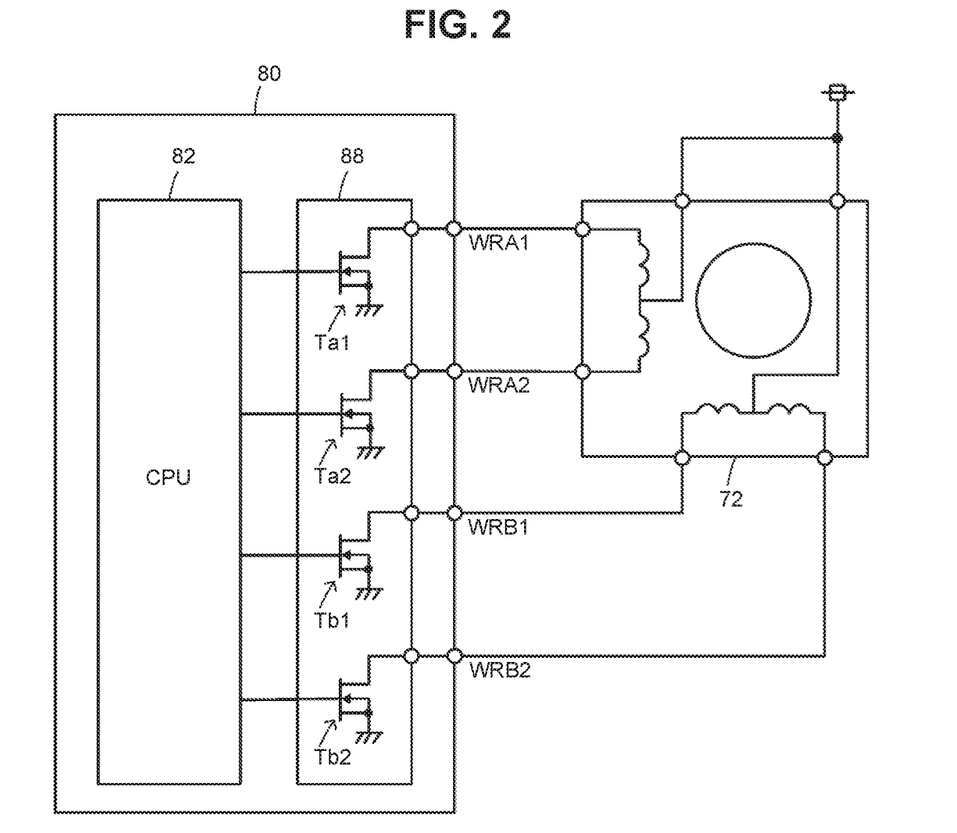
FIG. 2 is a diagram schematically illustrating configurations of a flow path switching valve driving motor and a motor driver.

FIG. 1 is a diagram schematically illustrating a configuration of a vehicle 20 according to one embodiment of the present disclosure. FIG. 2 is a diagram schematically illustrating configurations of a flow path switching valve driving motor 72 and a motor driver 88. As illustrated, the vehicle 20 of the embodiment includes a motor 32, an inverter 34, an electronic control unit for a motor (hereinafter referred to as a "motor ECU") 35, a battery 36, an electronic control unit for a battery (hereinafter referred to as a "battery ECU") 37, a system main relay 38, a battery boost converter 40, an FC boost converter 48, a fuel cell 50, a cooling device 60, a main electronic control unit (hereinafter referred to as a "main ECU") 80, and an electronic control unit for authentication (hereinafter referred to as an "authentication ECU") 100.

The motor 32 is composed of a synchronous motor drive, and includes a rotor in which a permanent magnet is embedded, and a stator on which a three-phase coil is wound. The rotor of the motor 32 is connected to a drive shaft 26, which is connected to drive wheels 22a, 22b via a differential gear 24. The inverter 34 is connected to the motor 32 and to high-voltage power lines 42. The inverter 34 is composed of a commonly known inverter circuit having six transistors and six diodes. The motor 32 is rotationally driven by the transistor of the inverter 34 that is switched and controlled by the motor ECU 35.

The motor ECU 35 is composed of a microprocessor having a CPU as a main unit (not shown). In addition to the CPU, the motor ECU 35 includes a ROM that stores a processing program, a RAM that temporarily stores data, an input and output port (not shown), a communication port (not shown), and the like. A rotational position $\theta_m$, and the like, detected by a rotational position detection sensor (for example, a resolver) 32a that detects the rotational position of the rotor of the motor 32 is input into the motor ECU 35 through the input port. Further, a switching control signal, and the like, is output to the transistor of the inverter 34 through the output port from the motor ECU 35. The motor ECU 35 calculates the rotational frequency $N_m$ of the motor 32 based on the rotational position $\theta_m$ of the rotor of the motor 32, detected by the rotational position detection sensor 32a.

The battery 36 is composed of, for example, a lithium-ion secondary battery or a nickel hydrogen secondary battery, and is connected to low-voltage power lines 44. The battery 36 is managed by a battery ECU 37.

The battery ECU 37 is composed of a microprocessor having a CPU as a main unit (not shown). In addition to the CPU, the battery ECU 37 includes a ROM that stores a processing program, a RAM that temporarily stores data, an input and output port (not shown), a communication port (not shown), and the like. A voltage VB from a voltage sensor 36a mounted between terminals of the battery 36, a current IB from a current sensor 36b mounted on an output terminal of the battery 36, a battery temperature TB from a temperature sensor 36c mounted on the battery 36, and the like, are input into the battery ECU 37 through the input port. The battery ECU 37 calculates a storage ratio SOC based on the integrated value of the current IB from the current sensor 36b. The storage ratio SOC is a ratio of the capacity of power dischargeable from the battery 36 to the total capacity of the battery 36. Moreover, the battery ECU 37 also calculates battery input and output limits $W_{in}$ and $W_{out}$, which are the maximum allowable powers that may be charged to and discharged from the battery 36 based on the storage ratio SOC or the battery temperature TB from the temperature sensor 36c. Furthermore, based on the storage ratio SOC, the battery ECU 37 also sets a charge and discharge demand power $P_b^*$ (the discharge side is positive) required by the battery 36.

The battery boost converter 40 is connected to the high-voltage power lines 42 and the low-voltage power lines 44, and is composed of a commonly known buck-boost converter circuit having two transistors, two diodes, and one reactor.

A smoothing capacitor 46 is connected to a positive electrode bus and a negative electrode bus of the high-voltage power line 42. Further, on the low-voltage power lines 44, the smoothing capacitor 46 is connected and the system main relay 38 is mounted.

The fuel cell 50 is composed of a stack of solid polymer fuel cells, which is formed by laminating a plurality of cells, each of which consists of an electrolyte membrane, an anode electrode and a cathode electrode sandwiching the electrolyte membrane therebetween, and a separator serving as a wall between the cells. The fuel cell 50 generates electric power from an electrochemical reaction between hydrogen supplied from a hydrogen tank 52 to the anode electrode through a hydrogen valve 54 and oxygen in the air supplied from a blower 56 to the cathode electrode.

The fuel cell 50 is cooled by the cooling device 60 exchanging heat with a coolant (cooling water). The cooling device 60 includes a circulation flow path 62 that connects the radiator 64 and the fuel cell 50, a circulation pump 66 that circulates the coolant in the circulation flow path 62, a bypass flow path 68 that connects the upstream side and the downstream side of the radiator 64 in the circulation flow path 62, and a flow path switching valve 70 that switches the destination of the coolant that passes through the fuel cell 50 to circulate to the radiator 64 side and the bypass flow path 68 side.

The flow path switching valve 70 is composed of a rotary valve in the present embodiment. The rotational position of the flow path switching valve 70 is adjusted by the flow path switching valve driving motor 72. As such, it is possible to adjust a distribution ratio of a flow rate of the coolant supplied on the radiator 64 to a flow rate of the coolant supplied on the bypass flow path 68.

Figure 3:
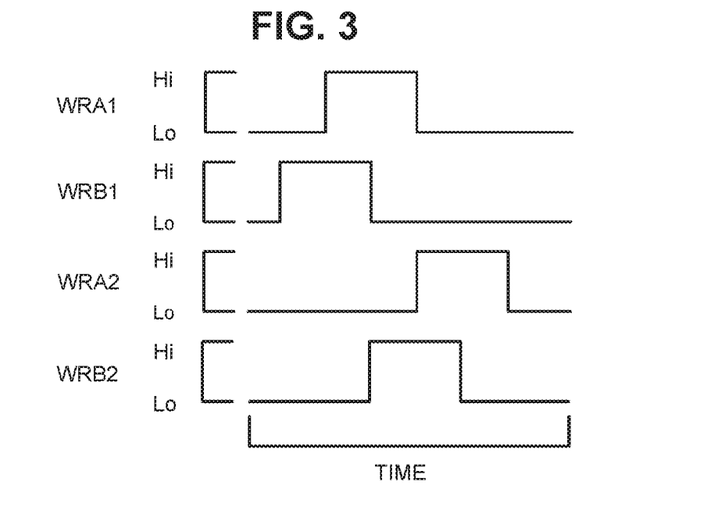
FIG. 3 is a diagram illustrating an example of waveforms shaped by application of electricity at the time at which the flow path switching valve driving motor is driven.

In the present embodiment, as illustrated in FIG. 2, the flow path switching valve driving motor 72 is composed of a two-phase stepping motor, and is driven by the motor driver 88 provided in the main ECU 80. In the present embodiment, the motor driver 88 is composed of a unipolar driving motor driver having four transistors Ta1, Ta2, Tb1, Tb2. In the present embodiment, as illustrated in FIG. 3, the motor driver 88 drives and controls the flow path switching valve driving motor 72, using a two-phase excitation which excites the coil by two phases per excitation. In addition, the motor driver 88 is not limited to the unipolar driving driver and may be a bipolar driving driver having eight transistors. Moreover, the excitation method is not limited to the two-phase excitation, and may be a one-phase excitation, a one-two-phase excitation, and the like.

The FC boost converter 48 is connected to an output terminal of the fuel cell 50 and the high-voltage power lines 42, and is composed of a commonly known boost converter circuit having one transistor, one diode, and one reactor.

The main ECU 80 is composed of a microprocessor having a CPU as a main unit (not shown). In addition to the CPU, the main ECU 80 includes a ROM that stores a processing program, a RAM that temporarily stores data, an input and output port (not shown), a communication port (not shown), and the like.

Signals from various sensors are input into the main ECU 80 through the input port. Examples of a signal input into the main ECU 80 include an inlet temperature $T_{in}$ (the temperature of the coolant near the inlet) from a temperature sensor 62a mounted near the inlet where the coolant flows into the fuel cell 50, or an outlet temperature $T_{out}$ (the temperature of the coolant near the outlet) from a temperature sensor 62b mounted near the outlet where the coolant flows out from the fuel cell 50. Further, since the main ECU 80 also functions as a drive control device for the vehicle 20, information required for travel control is also input. Examples of such information include an ignition signal IG from an ignition switch 90, a shift position SP from a shift position sensor 92 that detects the an operation position of a shift lever 91, an accelerator opening degree $A_{cc}$ from an accelerator pedal position sensor 94 that detects a depression amount of an accelerator pedal 93, a brake pedal position BP from the brake pedal position sensor 96 that detects a depression amount of the brake pedal 95, and a vehicle speed V from the vehicle speed sensor 98.

Various control signals are output from the main ECU 80 through the output port. Examples of a signal output from the main ECU 80 include a drive control signal to the system main relay 38, the switching control signal to a transistor of the battery boost converter 40, and the switching control signal to a transistor of the FC boost converter 48. In addition, examples of the signal include a drive signal to a pump motor that drives the circulation pump 66, a drive signal to a hydrogen valve driving motor that drives the hydrogen valve 54, and a drive signal to the flow path switching valve driving motor 72.

The main ECU 80 is communicably connected to the motor ECU 35, the battery ECU 37 and the authentication ECU 100, and exchanges various kinds of information and various signals with the motor ECU 35, the battery ECU 37, and the authentication ECU 100.

In a case of receiving a signal permitting start of the vehicle 20, output from the authentication ECU 100, the main ECU 80 turns on the system main relay 38 and activates the fuel cell 50 to set the vehicle 20 to a travelable state (a ready-on state) when the ignition switch 90 is turned on. On the other hand, in a case of receiving a signal inhibiting activation of the system, output from the authentication ECU 100, the main ECU 80 does not turn on the system main relay 38 even if the ignition switch 90 is turned on.

When the vehicle 20 is set to the ready-on state by the activation of the fuel cell 50, the main ECU 80 controls the operation of the fuel cell 50, and drives and controls the motor 32 such that a demand torque $T_d^*$ according to the accelerator opening degree $A_{cc}$ is output to the drive shaft 26, using the power generated from the fuel cell 50 or the charge and discharge power from the battery 36. Further, when the fuel cell 50 is activated, the main ECU 80 controls the cooling device 60 such that the temperature of the fuel cell 50 is maintained at an appropriate temperature. The control of the cooling device 60 is performed by setting a target valve position (the distribution ratio of the flow rate of the coolant to the radiator 64 to the flow rate of the coolant to the bypass flow path 68) of the flow path switching valve 70 such that the outlet temperature $T_{out}$ becomes a target temperature (for example, 60° C. to 70° C.) based on the inlet temperature $T_{in}$ from the temperature sensor 62a and the outlet temperature $T_{out}$ from the temperature sensor 62b, and by driving and controlling the flow path switching valve driving motor 72 such that the valve position of the flow path switching valve 70 is set to the target valve position. In the present embodiment, since the flow path switching valve driving motor 72 is composed of the stepping motor, driving and controlling the flow path switching valve driving motor 72 is performed by outputting a pulse signal from the motor driver 88 such that the number of steps from the original position matches the number of steps corresponding to the target valve position.

The authentication ECU 100 is composed of a microprocessor having a CPU as a main unit (not shown). In addition to the CPU, the authentication ECU 100 includes a ROM that stores a processing program, a RAM that temporarily stores data, an input and output port (not shown), a communication port (not shown), and the like.

Although illustration is omitted, the authentication ECU 100 is connected to a transmitter that transmits a request signal to a detection area on the outside of the vehicle 20 and inside the passenger compartment, and a receiver that receives an ID code transmitted from a smart key 102 in response to reception of the request signal. When a driver carrying the smart key 102 enters the detection area, the authentication ECU 100 checks the ID code received from the smart key 102 and automatically unlocks the door. Conversely, when the driver carrying the smart key 102 unlocks the door, exits the vehicle 20 and goes away from the detection area, the authentication ECU 100 automatically locks the door.

In addition, when the received ID code proves to be correct as a result of checking, the authentication ECU 100 outputs a signal permitting the start of the vehicle 20 to the main ECU 80. Conversely, when the received ID code cannot be checked or proves to be incorrect as a result of checking, the authentication ECU 100 outputs a signal inhibiting the start of the vehicle 20 to the main ECU 80. Further, an opening or closing signal that detects opening or closing of the door is also input from a door switch into the authentication ECU 100 through the input port. When the opening of the door is detected by the door switch during the start (during the ready-on state) of the vehicle 20, the authentication ECU 100 transmits the request signal to the detection area, receives the ID code from the smart key 102, and checks the received ID code. Conversely, when the received ID code cannot be checked or proves to be incorrect as a result of checking, the authentication ECU 100 turns on a warning light and repeats checking the ID code at predetermined time intervals.

Figure 4:
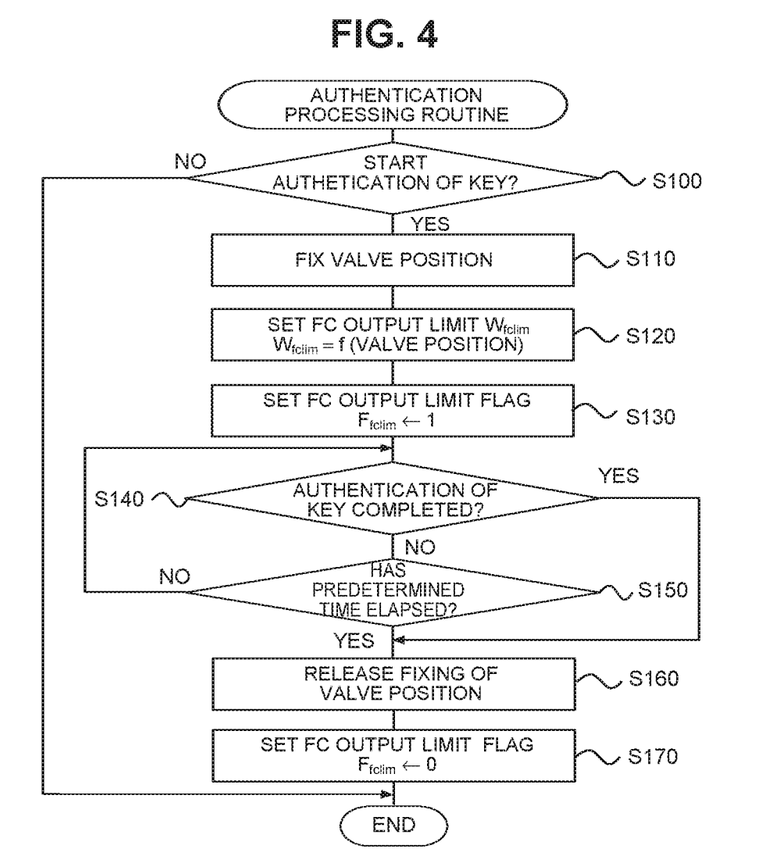
FIG. 4 is a flowchart illustrating an example of an authentication processing routine performed by an authentication ECU.

Next, an operation of the vehicle 20 of the embodiment configured as the above will be described. Specifically, the operation of the vehicle 20 during authentication of the smart key 102 will be described. FIG. 4 is a flowchart illustrating an example of an authentication processing routine performed by the authentication ECU 100. The routine is repeatedly performed every predetermined time (for example, every several milliseconds) during the start of the vehicle 20 (during the ready-on state).

Figure 5:
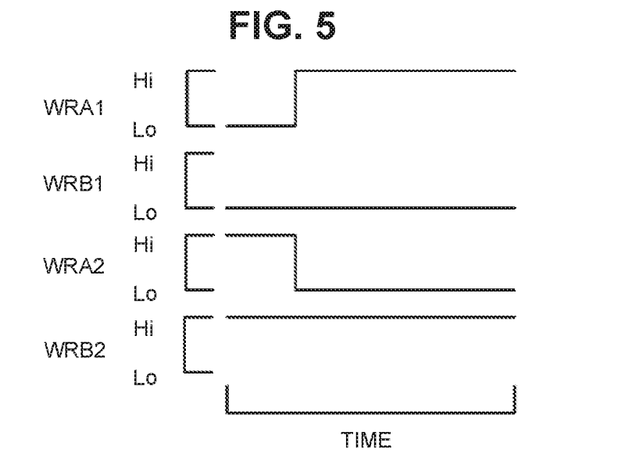
FIG. 5 is a diagram illustrating an example of waveforms shaped by application of electricity at the time at which the flow path switching valve driving motor is locked.

When an authentication process is performed, the CPU of the authentication ECU 100 first determines whether to start the authentication of the smart key 102 (step S100). When the CPU determines not to start the authentication, the authentication process is terminated. On the other hand, when the CPU determines to start the authentication, the position (opening degree) of the flow path switching valve 70 is fixed (step S110). The process of step S110 is performed by outputting, to the main ECU 80, a control command for fixing the valve position. As illustrated in FIG. 5, upon reception of the control command, the main ECU 80 controls the motor driver 88 such that the motor driver 88 maintains the state in which the two-phase coil is electrically excited, and locks an output shaft of the flow path switching valve driving motor 72 at the rotational position in the state. It is possible to curb the occurrence of surge noise that interferes with communication between the authentication ECU 100 and the smart key 102 by fixing the on or off state of the transistors Ta1, Ta2, Tb1, Tb2 of the motor driver 88, and curb the occurrence of authentication failure. In addition, the process of step S110 may be performed by stopping application of electricity to all the coils.

Figure 6:
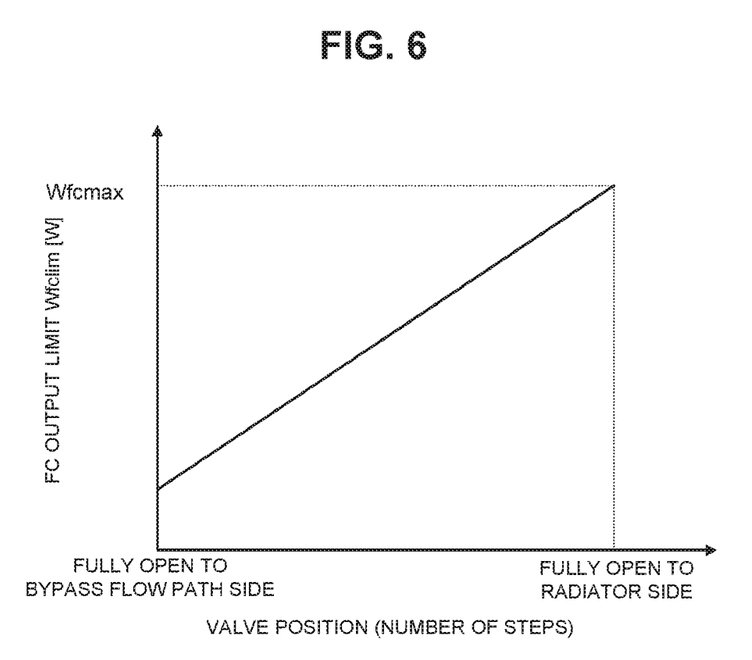
FIG. 6 is a diagram illustrating an example of a map for setting a limit of fuel cell (FC) output.
Figure 7:
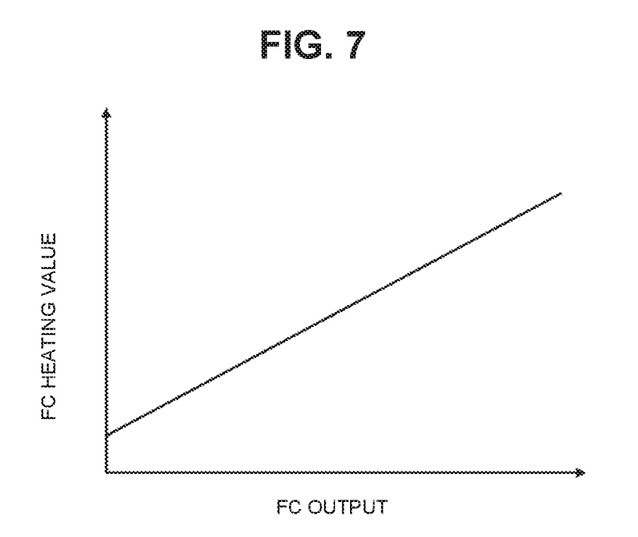
FIG. 7 is a diagram illustrating a relationship between the FC output and an amount of power generated from the FC.

Subsequently, based on the current valve position of the flow path switching valve 70, an FC output limit $W_{fclim}$, which is the upper limit value of the output that the fuel cell 50 can generate, is set (step S120), and simultaneously the FC output limit flag $F_{fclim}$ for limiting the output of the fuel cell 50 is set to the value 1 (step S130). Moreover, the current valve position can be detected by counting the number of steps from the original position. The output of the fuel cell 50 is limited when the valve position of the flow path switching valve 70 is fixed because, in some cases, the fuel cell 50 cannot be sufficiently cooled by the cooling device 60 when the valve position is fixed. For example, when the valve position of the flow path switching valve 70 is fixed at a position where it is fully open to the bypass flow path 68 side, the fuel cell 50 is not substantially cooled. As a result, the fuel cell 50 may overheat due to lack of cooling when the fuel cell 50 is operated as usual. Therefore, in the present embodiment, even though the valve position is fixed to curb the occurrence of surge noise when the authentication of the smart key 102 is performed, the output of the fuel cell 50 is simultaneously limited to curb overheating of the fuel cell 50 due to lack of cooling. In the present embodiment, the FC output limit $W_{fclim}$ is set by determining the relationship between the current valve position and the FC output limit $W_{fclim}$ in advance and storing the relationship in the ROM as a map for setting the FC output limit, and, when the current valve position is given, deriving, from the map, the FC output limit $W_{fclim}$ corresponding to the current valve position. An example of the map for setting the FC output limit is illustrated in FIG. 6. As shown, the FC output limit $W_{fclim}$ is set to increase (that is, the output limit of the fuel cell 50 is alleviated) as the current valve position is closer to the position where the valve is fully open to the radiator 64 side. It makes allowance for the fact that a heating value of the fuel cell 50 increases as the output increases, as illustrated in FIG. 7. As such, it is possible to curb an excessive output limit of the fuel cell 50 while curbing overheating of the fuel cell 50. Further, when the valve is currently at the position where it is fully open to the radiator 64 side, the FC output limit $W_{fclim}$ is set to a rated maximum output $W_{fcmax}$ of the fuel cell 50, as illustrated in FIG. 6. In such a case, the output of the fuel cell 50 is not substantially limited.

Then, it is respectively determined whether the authentication is completed (step S140), and whether a predetermined time has elapsed after the start of the authentication (step S150). Here, the predetermined time is slightly longer than the time generally required for authentication, and is set to, for example, 3 seconds. When it is determined that the authentication is not completed and the predetermined time has not elapsed, the process returns to step S140 and is repeated. On the other hand, when it is determined that the authentication is completed, or the predetermined time has elapsed without completion of the authentication, the fixing of the valve position of the flow path switching valve 70 is released (step S160) and simultaneously the FC output limit flag $F_{fclim}$ is set to the value 0 such that the output limit of the fuel cell 50 is canceled (step S170). Then, the authentication processing routine is terminated.

Here, the authentication processing routine is performed during the start of the vehicle 20 as described above. The authentication of the smart key 102 (checking the ID code) during the start of the vehicle 20 is performed when, for example, the ID code proves to be correct as a result of checking the ID code at the activation of the smart key system, and the vehicle 20 is started, but then the door is opened and the smart key 102 is brought out. In such a case, since the starting state (the ready-on state) of the vehicle 20 is maintained until the ignition is turned off, it is possible to curb an occurrence of an authentication failure and overheating of the fuel cell 50 due to lack of the coolant by fixing the valve position of the flow path switching valve 70 and limiting the output of the fuel cell 50.

Figure 8:
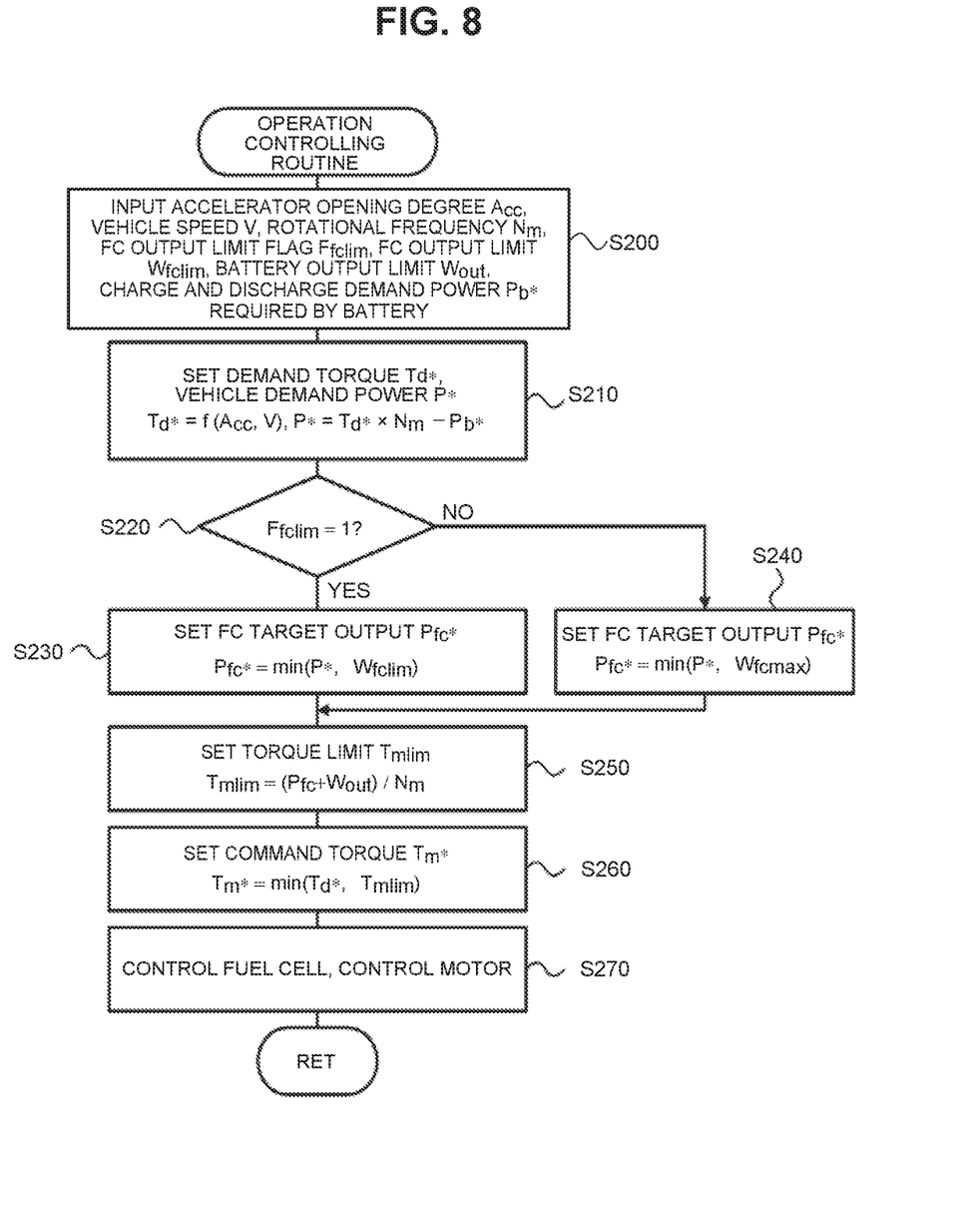
FIG. 8 is a flowchart illustrating an example of an operation controlling routine performed by a main ECU.

Next, control of the vehicle 20 using the FC output limit flag $F_{fclim}$ or the FC output limit $W_{fclim}$ will be described. FIG. 8 is a flowchart illustrating an example of the operation controlling routine performed by the main ECU 80. The routine is repeatedly performed at every predetermined time (for example, every several milliseconds) during the start of the vehicle 20 (during the ready-on state).

When the operation controlling routine is performed, the CPU 82 of the main ECU 80 first inputs data required for controlling, such as the accelerator opening degree $A_{cc}$ from the accelerator pedal position sensor 94, the vehicle speed V from the vehicle speed sensor 98, the rotational frequency $N_m$ of the motor 32, the battery output limit $W_{out}$, the FC output limit flag $F_{fclim}$, the FC output limit $W_{fclim}$, and the charge and discharge demand power $P_b^*$ required by the battery 36 (step S200). Moreover, the rotational frequency $N_m$ of the motor 32 is acquired from the motor ECU 35 via communication, and the battery output limit $W_{out}$ or the charge and discharge demand power $P_b^*$ is acquired from the battery ECU 37 via communication. In addition, the FC output limit flag $F_{fclim}$ or the FC output limit $W_{fclim}$ is acquired from the authentication ECU 100 via communication. Subsequently, based on the input accelerator opening degree $A_{cc}$ and the vehicle speed V, the demand torque $T_d^*$ required for traveling and a vehicle demand power $P^*$ required for the entire vehicle 20 are set (step S210). Moreover, the demand torque $T_d^*$ is acquired by determining the relationship between the accelerator opening degree $A_{cc}$, the vehicle speed V, and the demand torque $T_d^*$ in advance and storing the relationship in the ROM 84 as a map for setting the demand torque $T_d^*$, and deriving, from the map, a corresponding demand torque $T_d^*$ when the accelerator opening degree $A_{cc}$ and the vehicle speed V are given. Further, the vehicle demand power $P^*$ is calculated by subtracting the charge and discharge demand power $P_b^*$ (the discharge side is positive) from a traveling demand power that is acquired by multiplying the demand torque $T_d^*$ by the rotational frequency $N_m$ of the motor 32.

Next, it is determined whether the FC output limit flag $F_{fclim}$ has a value 1, that is, whether the output of the fuel cell 50 is limited during the authentication of the smart key 102 (step S220). When it is determined that the FC output limit flag $F_{fclim}$ is not the value 1 but the value 0, the smaller one of the vehicle demand power $P^*$ and the rated maximum output $W_{fcmax}$ of the fuel cell 50 is set as an FC target output $P_{fc}^*$ (step S240). On the other hand, when it is determined that the FC output limit flag $F_{fclim}$ is the value 1, the smaller one of the vehicle demand power $P^*$ and the FC output limit $W_{fclim}$ is set as the FC target output $P_{fc}^*$ (step S230). Subsequently, a torque limit $T_{mlim}$, which is the upper limit of the torque that can be output from the motor 32, is set by dividing the sum of the FC target output $P_{fc}^*$ and the battery output limit $W_{out}$ by the rotational frequency $N_m$ of the motor 32 (step S250). Then, the smaller one of the demand torque $T_d^*$ and the torque limit $T_{mlim}$ is set as a command torque $T_m^*$ to be output from the motor 32 (step S260). In such a manner, when the FC target output $P_{fc}^*$ and the command torque $T_m^*$ are set, the hydrogen valve 54 and the blower 56 are controlled so that the fuel cell 50 can generate power with the FC target output $P_{fc}^*$, and the transistor of the inverter 34 is switched and controlled so that a torque matching the command torque $T_m^*$ can be output from the motor 32 (step S270). Then the routine is terminated.

In the vehicle 20 of the present embodiment described above, when the authentication of the smart key 102 is performed, the valve position of the flow path switching valve 70 of the cooling device 60 is fixed, and simultaneously the output of the fuel cell 50 is limited. Conversely, when the authentication is terminated or the predetermined time has elapsed, the fixing of the valve position is released and the output limit of the fuel cell 50 is canceled. As such, it is possible to curb the occurrence of noise that may interfere with communication with the smart key 102 by fixing the valve position of the flow path switching valve 70, and curb overheating of the fuel cell 50 even if the valve position of the flow path switching valve 70 is fixed near the position where it is fully open to the bypass flow path 68 side.

Moreover, the FC output limit $W_{fclim}$ is set such that the output limit of the fuel cell 50 is alleviated as the fixed valve position of the flow path switching valve 70 is closer to the position where it is fully open to the radiator 64 side. As such, since the output of the fuel cell 50 is not excessively limited, an adverse effect caused by limiting the output of the fuel cell 50, for example, a decrease in torque used for traveling a vehicle or a decrease in the storage ratio SOC of the battery 36, can be minimized.

In the embodiment, it was described that the flow path switching valve driving motor 72 is composed of a stepping motor. However, any type of motor may be employed as long as the motor can adjust the opening degree of the flow path switching valve 70. In such a case, a rotational position detection sensor that detects the valve position of the flow path switching valve 70 may be separately provided.

In the embodiment, the value changed based on the valve position of the flow path switching valve 70 is set as the output limit $W_{fclim}$. However, regardless of the valve position of the flow path switching valve 70, a constant value may be set as the output limit $W_{fclim}$.

What is claimed is:
1. A vehicle comprising:
   a fuel cell;
   a cooling device configured to cool the fuel cell by exchanging heat with a coolant;
   a smart key system configured to communicate with a mobile device and performs authentication of the mobile device; and
   a control device configured to control the fuel cell and the cooling device, wherein the cooling device includes:
a circulation flow path configured to connect the fuel cell and a radiator;
a pump configured to circulate the coolant in the circulation flow path;
a bypass flow path configured to connect an upstream side and a downstream side of the radiator in the circulation flow path;
a flow path switching valve configured to switch a destination of the coolant that passes through the fuel cell to circulate to a radiator side and a bypass flow path side; and
a motor configured to drive the flow path switching valve, and
wherein the control device is configured to, when the smart key system performs the authentication of the mobile device, stop an operation of the flow path switching valve simultaneously with limiting output of the fuel cell.

2. The vehicle according to claim 1, wherein the control device is configured to, when the authentication of the mobile device is completed or when a predetermined time elapses after the operation of the flow path switching valve is stopped, release a stopped state of the operation of the flow path switching valve simultaneously with canceling a limit of the output of the fuel cell.

3. The vehicle according to claim 1, wherein:
the flow path switching valve is configured to adjust a distribution ratio of a flow rate of the coolant flowing on the radiator to a flow rate of the coolant flowing on the bypass flow path; and
the control device is configured to:
when the smart key system performs the authentication, stop the operation of the flow path switching valve;
set a maximum output of the fuel cell based on a position at which the flow path switching valve is stopped; and
control the fuel cell such that the output of the fuel cell does not exceed the maximum output.

4. The vehicle according to claim 3, wherein the control device is configured to set the maximum output such that a larger output from the fuel cell is allowed when the position at which the flow path switching valve is stopped is on the radiator side than when the position at which the flow path switching valve is stopped is on the bypass flow path side.

5. The vehicle according to claim 3, wherein:
the motor is a stepping motor; and
the control device is configured to, when the smart key system performs the authentication, fix a position of the flow path switching valve by maintaining electrical excitation to a coil of the motor.

6. The vehicle according to claim 1, wherein:
the flow path switching valve is configured to adjust a distribution ratio of a flow rate of the coolant flowing on the radiator to a flow rate of the coolant flowing on the bypass flow path; and
the control device is configured to:
set a maximum output of the fuel cell based on the distribution ratio; and
when the smart key system performs the authentication, control the fuel cell such that the output of the fuel cell does not exceed the maximum output.

7. The vehicle according to claim 6, wherein the control device is configured to set the maximum output such that the larger the flow rate of the coolant flowing on the radiator is in the distribution ratio, the larger the maximum output becomes.

8. A control method, the control method controlling a cooling device of a fuel cell mounted on a vehicle, the control method comprising:
stopping an operation of a flow path switching valve and limiting output of the fuel cell when a smart key system mounted on the vehicle performs authentication of a mobile device, wherein:
the fuel cell is connected to a radiator via a circulation flow path in which a coolant circulates;
an upstream side and a downstream side of the radiator in the circulation flow path are connected to each other via a bypass flow path; and
the flow path switching valve is configured to switch a destination of the coolant that passes through the fuel cell to circulate to a radiator side and a bypass flow path side.

9. The control method according to claim 8 further comprising canceling a limit of the output of the fuel cell by resuming the operation of the flow path switching valve when the authentication of the mobile device is completed or when a predetermined time elapses after the operation of the flow path switching valve is stopped.

10. The control method according to claim 8 further comprising:
setting a maximum output of the fuel cell based on a distribution ratio of a flow rate of the coolant flowing on the radiator to a flow rate of the coolant flowing on the bypass flow path in the flow path switching valve; and
controlling the fuel cell such that the output of the fuel cell does not exceed the maximum output when the authentication is performed.

* * * * *